(12) United States Patent
Janes et al.

(10) Patent No.: US 11,867,916 B2
(45) Date of Patent: Jan. 9, 2024

(54) DEVICE APPARATUS FOR PROJECTING A LASER BEAM FOR GENERATING AN IMAGE ON THE RETINA OF AN EYE

(71) Applicant: Fraunhofer-Gesellschaft zur Förderung der angewandten Forschung e.V., Munich (DE)

(72) Inventors: Joachim Janes, Itzehoe (DE); Ulrich Hofmann, Itzehoe (DE)

(73) Assignee: Fraunhofer-Gesellschaft zur Förderung der angewandten Forschung e.V., Munich (DE)

( * ) Notice: Subject to any disclaimer, the term of this patent is extended or adjusted under 35 U.S.C. 154(b) by 576 days.

(21) Appl. No.: 17/250,219

(22) PCT Filed: Jun. 19, 2019

(86) PCT No.: PCT/EP2019/066142
§ 371 (c)(1),
(2) Date: Dec. 17, 2020

(87) PCT Pub. No.: WO2019/243395
PCT Pub. Date: Dec. 26, 2019

(65) Prior Publication Data
US 2021/0231963 A1 Jul. 29, 2021

(30) Foreign Application Priority Data
Jun. 19, 2018 (DE) .................... 10 2018 209 886.7

(51) Int. Cl.
*G02B 27/01* (2006.01)
*G02B 26/08* (2006.01)
*G06F 3/01* (2006.01)

(52) U.S. Cl.
CPC ..... *G02B 27/0179* (2013.01); *G02B 26/0833* (2013.01); *G02B 27/0172* (2013.01);
(Continued)

(58) Field of Classification Search
USPC .................. 359/1–35, 196.1–226.3, 629–631
See application file for complete search history.

(56) References Cited

U.S. PATENT DOCUMENTS 5,477,385 A * 12/1995 Freeman ................ G02B 21/22
359/639
6,522,474 B2 * 2/2003 Cobb .................. G02B 27/0172
359/633
(Continued)

FOREIGN PATENT DOCUMENTS

CN        103298394        9/2013
DE       102004060576        7/2006
(Continued)

OTHER PUBLICATIONS

"German Application Serial No. 10 2018 209 886.7, Office Action dated Mar. 12, 2019", (Mar. 12, 2019), 7 pgs.
(Continued)

*Primary Examiner* — Jennifer D. Carruth
(74) *Attorney, Agent, or Firm* — Schwegman Lundberg & Woessner, P.A.

(57) ABSTRACT

The disclosure relates to an apparatus device for projecting an image on the retina of an eye with a laser projection device, a device for determining the orientation of the eye, and with a tracking unit for tracking the laser beam of the laser projection device according to the determined orientation.

15 Claims, 10 Drawing Sheets

Fig.5

Figure 1:
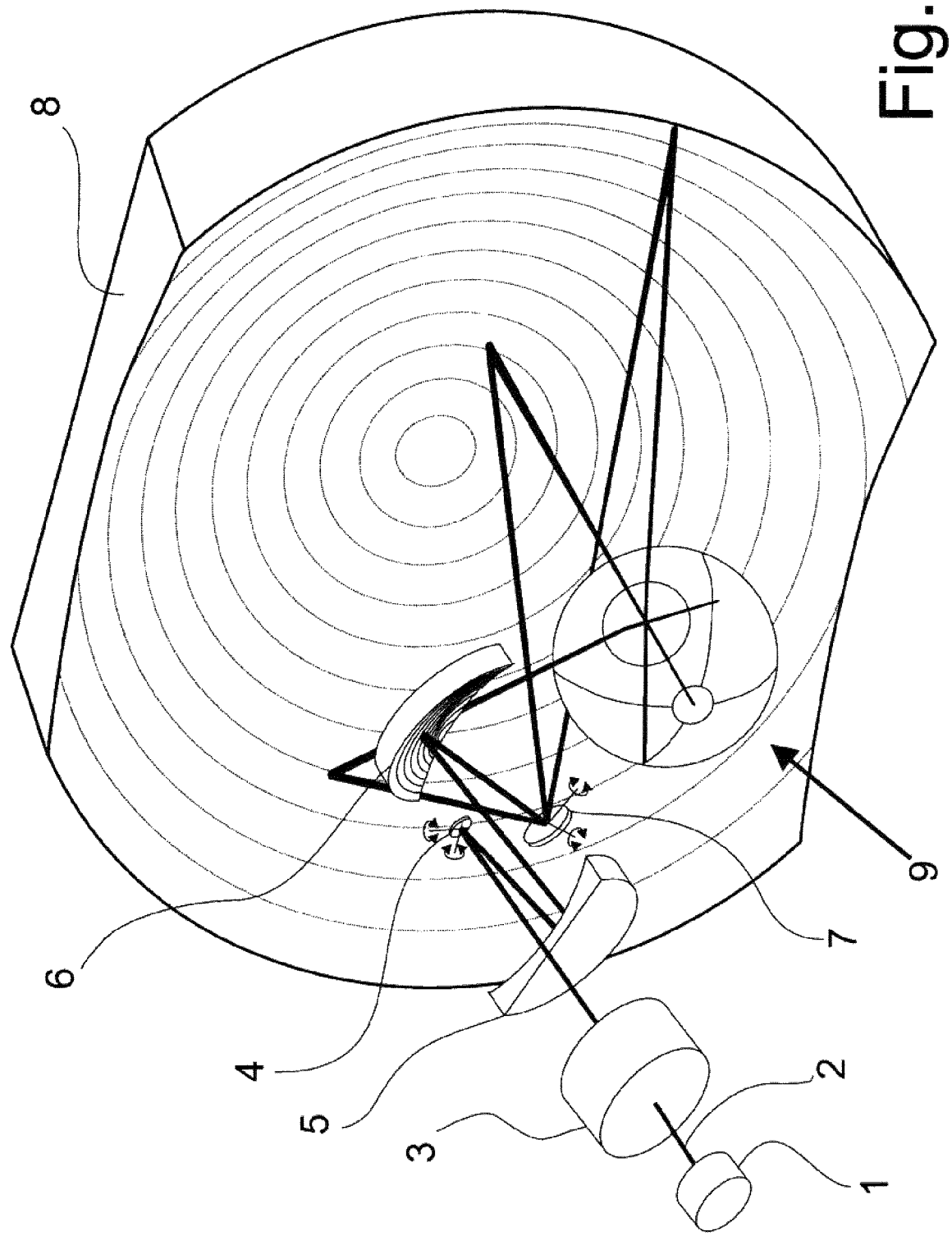

(52) U.S. Cl.
CPC ...... *G06F 3/013* (2013.01); *G02B 2027/0178* (2013.01); *G02B 2027/0187* (2013.01)

(56) References Cited

U.S. PATENT DOCUMENTS

| | | | |
|---|---|---|---|
| 6,639,570 B2 | 10/2003 | Furness, III et al. | |
| 6,803,928 B2* | 10/2004 | Bimber | G06F 3/012 |
| | | | 715/757 |
| 7,068,444 B2* | 6/2006 | Nishi | G02B 17/08 |
| | | | 359/708 |
| 2008/0030685 A1 | 2/2008 | Fergason et al. | |
| 2012/0257166 A1 | 10/2012 | Francis et al. | |
| 2016/0274365 A1 | 9/2016 | Bailey et al. | |
| 2017/0115483 A1 | 4/2017 | Aleem et al. | |
| 2017/0285343 A1 | 10/2017 | Belenkii et al. | |
| 2018/0129041 A1 | 5/2018 | Aleem et al. | |
| 2021/0231963 A1* | 7/2021 | Janes | G02B 27/0179 |

FOREIGN PATENT DOCUMENTS

| | | |
|---|---|---|
| DE | 102013206788 | 10/2014 |
| EP | 2803633 | 11/2014 |
| EP | 2808720 | 12/2014 |
| WO | WO-2012095620 A1 | 7/2012 |
| WO | WO-2017037708 A1 | 3/2017 |

OTHER PUBLICATIONS

"International Application Serial No. PCT/EP2019/066142, International Search Report dated Sep. 2, 2019", w/ English Translation, (Sep. 2, 2019), 7 pgs.

"International Application Serial No. PCT/EP2019/066142, Written Opinion dated Sep. 2, 2019", (Sep. 2, 2019), 7 pgs.

Jang, Changwon, et al., "Retinal 3D: augmented reality near-eye display via pupil-tracked light field projection on retina", ACM Transactions on Graphics (TOG) 36.6, (2017), 1-13.

"Chinese Application Serial No. 201980051900.X, Office Action dated Oct. 10, 2022", w English Translation, (Oct. 10, 2022), 10 pgs.

"Chinese Application Serial No. 201980051900.X, Search Report dated Sep. 28, 2022", (Sep. 28, 2022), 2 pgs.

"Chinese Application Serial No. 201980051900.X, Office Action dated May 31, 2023", w English Translation, (May 31, 2023), 12 pgs.

* cited by examiner

DEVICE APPARATUS FOR PROJECTING A LASER BEAM FOR GENERATING AN IMAGE ON THE RETINA OF AN EYE

PRIORITY APPLICATIONS

This application is a U.S. National Stage Filing under 35 U.S.C. § 371 from international Application No. PCT/EP2019/066142, filed on Jun. 19, 2019, and published as WO2019/243395 on Dec. 26, 2019, which claims the benefit of priority to German Application No. 10 2018 209 886.7, filed on Jun. 19, 2018; the benefit of priority of each of which is hereby claimed herein, and which application and publication are hereby incorporated herein by reference in its entirety.

The invention relates to a projection device which enables a laser projection on the retina of an eye. It is hence in the field of optics, laser technology and data processing and is usable particularly advantageously, for example in entertainment electronics, as display function for smartphones, in displays for controlling machines and vehicles, or even as display function of a navigation instrument.

Various methods for imaging in an eye of a living creature, in particular of a human being, are known. A differentiation must thereby be made between real images which are imaged on the retina and images which are produced by a laser beam, and in particular if this laser beam reaches the retina of a human eye in a scanning method. So-called head-up displays (HUD) form a good example of this, in which a real image is generated with a laser beam and subsequently is projected onto the retina with the help of an optical imaging system. Often, such images are superimposed with the real images which are situated in front of the eye of the observer, by partially mirrored or partially mirroring surfaces being used for reflecting the virtual images (for example a windscreen). Such imaging methods can hence be used also for a so-called augmented reality, apart from generating a virtual reality. The device presented here primarily generates a collection of pixels which are illuminated by a scanned laser on the retina.

Laser projection devices for generating images on the retina of an eye are known respectively from US 2017/0115483 A1, from US 2016/0274365 A1 and from U.S. Pat. No. 6,639,570 B2.

The present invention has set the task of producing a device with which an image can be generated, with low complexity and irrespective of the viewing direction of the person, on the retina of the person. The object is achieved by the features of the invention according to patent claim 1. Patent claims 2 to 13 present implementations of the device. In addition, the invention relates to a spectacle device according to claim 14. An advantageous implementation of such a spectacle device is presented in patent claim 15.

The invention hence relates to a device for projecting a laser beam for generating an image on the retina of an eye with a laser projection device, a device for determining the orientation of the eye and with a tracking device for tracking the laser beam of the laser projection device according to the determined orientation.

Corresponding laser projection devices are basically already known. Normally, such devices use one or more mirrors for controlled deflection of a laser beam in order to scan, with the latter, an image region, for example in lines and columns. During the scanning process, the intensity of the laser beam is changed such that each pixel is irradiated with the brightness assigned thereto. The laser beam can thereby be transmitted with a single wavelength in order to generate a monochrome image; however also simultaneously or successively, a series of a plurality of multi-coloured laser beams can be used for scanning in order to generate an altogether coloured and true-to-reality image by the superimposition of multi-coloured images.

Since the projection or the image is intended to be generated on the retina of a person, the imaging optics of the eye of the person must be taken into account for directing the laser beam. Since this is changed by changing the viewing direction of the person, respectively the viewing direction of the person should be determined contemporaneously by a so-called eye tracking and taken into account during directing of the laser beam. Corresponding eye-tracking methods which use for example a camera or a scanning laser are basically known. For example, such a system is described in the US patent document 2008/0030685 A1. It should thereby be taken into account that the eye tracking can also be implemented for both eyes of one person separately in order to control two devices for the projection in order to generate a separate image in each of the two eyes of the person. By eye tracking of both eyes, for example also the distance of a viewed object can be determined. Correspondingly, the two eyes of one person with their lines of sight are normally not orientated parallel to each other but the lines of sight meet in the case of a viewed object. By means of laser projection of different images in both eyes of the person, a stereoscopic image can be generated.

The tracking device, which is part of the device according to the invention for projecting an image, takes into account the determined orientation of the eye or eyes and directs the laser beam such that the image generation can be effected by the scanning laser beam respectively at a suitable angle, in particular parallel to the visual axis. The projected image, scanned by the laser projection device, and each of its pixels and each laser beam transmitting a pixel or illuminating it, is displaced by the tracking device such that, as a function of the viewing direction of the eye, each pixel remains at the same position of the retina even with a change in viewing direction.

Implementation of the invention can provide that the tracking device has an adjustment element in the form of a controllable deflection mirror, the adjustment angle of which can be controlled by a control device as a function of the determined orientation of the eye.

The adjustment element, which can be configured for example as a first MEMS deflection mirror must be very rapidly adjustable and trackable in order to be able to follow the rapid eye movements which are recorded by the eye tracking as far as possible in real time. The adjustment element can concern a miniaturised mirror element which can be controlled about two axes with respect to the angle and which serves to project the image to be scanned at the correct angle in the eye. The typical control- or regulating time in the adjustment of the adjustment element is in the range of a thousandth of a second or below. For example a piezo-operated MEMS adjustment element can be provided for this purpose. However, also irrespective of the type of drive, any vector scanner which can be adjusted correspondingly rapidly, can be used.

Also the eye tracking can be implemented by the eye tracking device with a corresponding frequency. A control device for the adjustment element receives the data of the eye tracking and controls the adjustment element according to the data.

The construction of the device for projecting an image can be designed such that the adjustment element is disposed in the beam path of the laser beam in front of the laser projection device. The beam path is then directed into the laser projection device with an angle of incidence which has an influence on the angle and the location on the retina, at which the laser projection device generates the scanned image.

It can be provided in addition that the laser projection device has a scanning deflection device, in particular in the form of a second MEMS deflection mirror. Also the laser projection device uses a deflection mirror which is actuated pivotably in two planes, the use of a MEMS deflection mirror being able to be advantageous. Such a MEMS mirror can be actuated, for example electrostatically, piezoelectrically, magnetically or purely mechanically. The advantage of such a 2D scanner is that both pivot axes of the mirror lie in one plane so that a common pivot point is present. Corresponding known 2D MEMS scanners at present reach oscillation frequencies of a few hundred hertz up to a few tens of kilohertz. Particularly advantageously, also so-called Lissajous scanning mirrors can be used.

The precondition for reliable image generation is the precise control of the angular position of the scanner for which a feedback about the mirror position is advantageous. For this purpose, for example read-out methods or optical position-sensitive detectors are known, e.g. disclosed in DE 10 2004 060 576 B4, strain gauges or capacitive and piezoelectric methods. From the measured values of the respective detectors, the angular coordinates of the deflection of the mirror can be calculated and the correspondingly currently illuminated pixels of the image to be projected can be determined. Then respectively a brightness value for one or more colours or a different type of colour coordinate can be assigned to these.

Corresponding 2D MEMS scanners are for example known from the patent documents EP 2 803 633 and EP 2 808 720 and also DE 10 2013 206 788 and DE 10 2004 060 576.

A particular embodiment of the invention can provide that the laser projection device has a first and a second parabolic mirror, the optical axes of which are orientated parallel to each other. It can thereby be provided that the adjustment element is disposed in the focal point of the first parabolic mirror of the laser projection device. A further embodiment can provide in addition that the scanning deflection device is disposed in the focal point of the second parabolic mirror of the laser projection device.

In the case of a corresponding arrangement with two parabolic mirrors, it is achieved by the positioning of the adjustment element in the focal point of the first parabolic mirror that a laser beam, which is reflected by the adjustment element in the parabolic mirror arrangement, is reflected by the first parabolic mirror parallel to the axis thereof. The parabolic mirror arrangement is designed such that the laser beam is reflected by the first parabolic mirror to the second parabolic mirror and that, in an orientation of the axes of both parabolic mirrors parallel to each other, the laser beam is orientated between the parabolic mirrors also parallel to the axis of the second parabolic mirror. By means of the second parabolic mirror, the laser beam is then transmitted in any case and irrespective of a parallel offset through the focal point of the second parabolic mirror. In the focal point of the second parabolic mirror, the deflection device, in particular the MEMS mirror of the laser projection device, is disposed so that the latter is encountered in any case by the laser beam. This deflection device ensures, by means of corresponding dynamic actuation, that the laser beam projects the image to be generated at the intended spatial angle.

The device according to the invention can be designed in one embodiment also such that, in the beam path behind the laser projection device, a reflection element, in particular in the form of a hollow mirror or a holographic mirror, is provided. With such a design, the device can be disposed partially next to the temple of a person, and the laser beam can be beamed in the reflection element by the laser projection device, which reflection element is disposed in front of the eye of the person in the manner of a spectacle lens. The reflection element can thereby be optically transparent and partially mirrored so that the person can look through the reflection element and can receive a real image of the surroundings. This real image is superimposed with the image projected by the laser.

For a distortion of the laser projection image, it can be provided that the reflection element is asymmetrical relative to the optical axis of the eye. Since the laser projection image impinges diagonally and at an angle into the reflection element, which is at a distance from the optical axis of the reflection element, for example between 45° and 80°, the corresponding distortion of the image can be compensated for by an asymmetric design of the reflection element.

The geometry of the reflection element can be determined such that, with a known positioning of the laser projection device, the beam path of the laser is simulated in different scan positions and the surface angle of the reflection element is established at any point such that an undistorted image is transmitted.

In addition to or instead of an optical correction, a possible implementation of the invention can also provide that an actuation device is provided and fitted such that, during actuation of the first and/or second MEMS mirror, a corrected deflection angle is determined from the respectively determined deflection angle in order to compensate for a distortion by the reflection element.

As indicated above already, the device according to the invention can have a monochrome laser, however also a plurality of lasers with different wavelengths or a tunable laser, as a result of which laser beams with different colours can be used simultaneously or successively and can pass through the device. Hence coloured images can be generated on the retina of the person.

A great advantage of the device according to the invention resides in the fact that essentially reflecting optical imaging elements are used so that no dispersion problems should be expected in the case of laser beams of a different wavelength. For the collimation and optical processing of the laser beam, a collimation device can however be provided in front of the parabolic mirrors and deflection devices, which collimation device also comprises refractive optical elements which should then however be colour-corrected.

Figure 9:
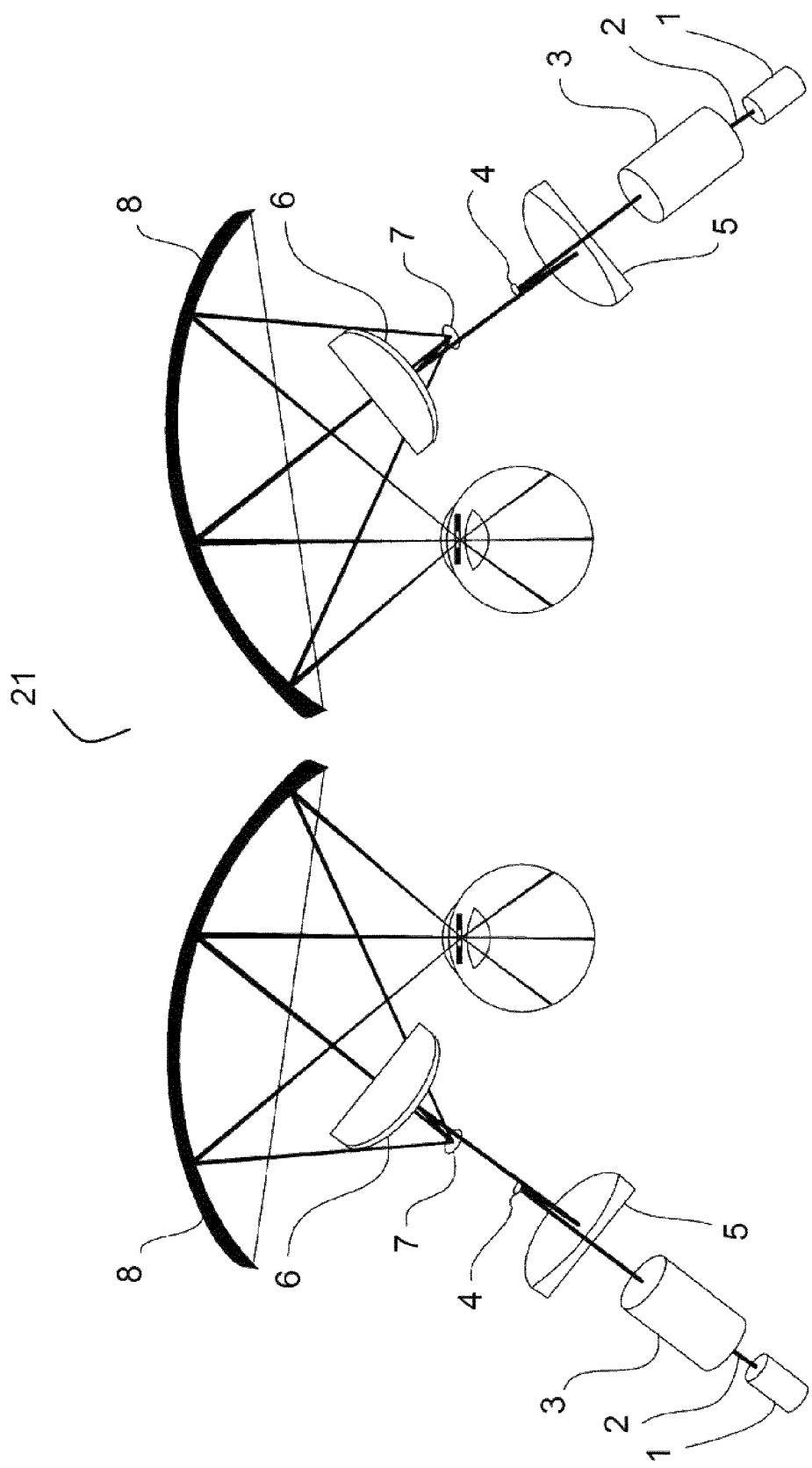
Figure 10:
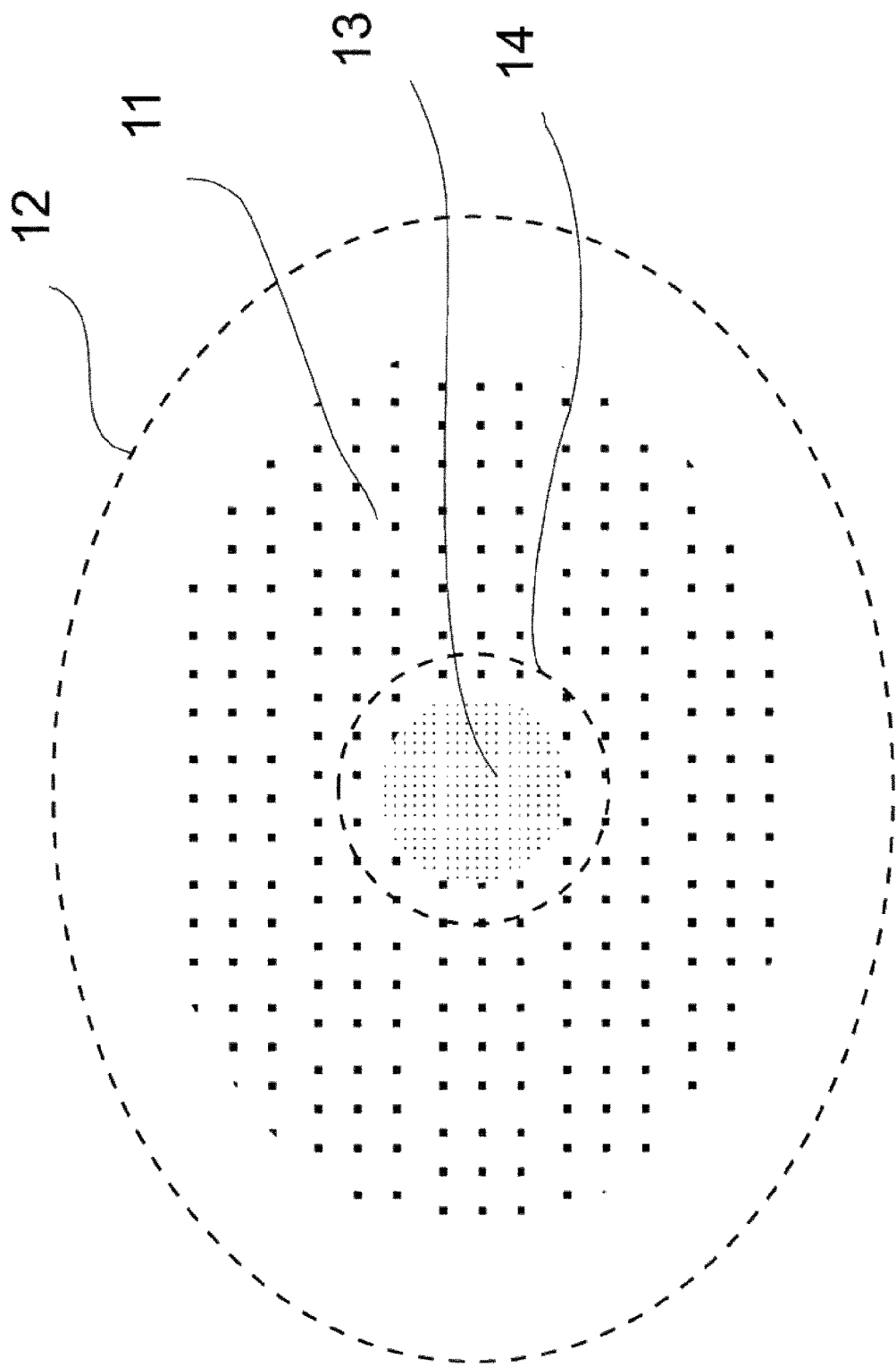

In the following, the invention is shown in Figures of a drawing on the basis of embodiments and is subsequently explained. There are thereby shown FIG. 1 a perspective illustration of the device with a horizontal deflection of the scanned laser beam, FIG. 2 the device of FIG. 1 in the case of a vertical deflection of the laser beam, FIG. 3 a schematic illustration of a so-called Gullstrand model eye with the optical elements and parameters defining the eye, FIG. 4 a sectional drawing in a horizontal plane with a plan view on the tracking device, the viewing direction of the eye being orientated straight ahead, FIG. 5 a sectional drawing as in FIG. 4, the viewing direction of the eye deviating horizontally by 10° from the straight ahead direction, FIG. 6 a sectional drawing in the vertical plane with a plan view on the tracking unit, the viewing direction of the eye being directed straight ahead, FIG. 7 a detailed view of the tracking unit/adjustment element with two different beam paths of the laser beam corresponding to two different viewing directions of the eye, FIG. 8 the construction of the device according to the invention taking into account the physiognomy of a person in the case of whom this is intended to be used, FIG. 9 schematically a spectacle device with two devices according to the invention and also FIG. 10 an illustration of different illuminations of the retina with different pixel densities for the retina and the fovea.

The device for direct image generation by a scanned laser beam on the retina of an eye with simultaneous tracking of the projection image, as a function of the time-dependent viewing direction of the eye, is illustrated in FIG. 1. An RGB laser 1 of the device delivers an RGB laser beam 2, with which the colour of a pixel can be controlled. The RGB laser beam can be made available also with an optical fibre and corresponding fibre optics. This laser beam 2 passes through a beam forming element 3, for example a collimation device, which consists of a suitable combination of lenses, with the help of which the geometric parameters of the RGB laser beam 2 (RGB=red/green/blue) are set. These are primarily the beam diameter, the Rayleigh range and the divergence. Since the RGB laser beam 2 concerns a combination or a temporal sequence of three partial beams with different wavelengths, it can be necessary to configure the lens combination of the beam forming element as an apochromatic lens.

The RGB laser beam thereafter impinges on the pivot element 4 (adjustment element) which is also termed first MEMS deflection mirror in this context.

The purpose of the adjustment element 4 resides in making the RGB laser beam 2 impinge at the specific angles α and β on the 2D MEMS scanner 7 of the laser projection device. The angles α and β are dependent upon the viewing direction of the eye. As a function of the viewing direction of the eye, the scanned image must be projected both at the correct angle and at the correct location in the eye. The adjustment element 4 stands in the focal point of the parabolic mirror 5 onto which the RGB laser beam 2 is deflected. The embodiment of the parabolic mirror 5 is such that it enables impingement of the RGB laser beam 2 on the adjustment element 4 and can reflect only the necessary angles which are adjusted by the adjustment element 4. For this reason, only the lower part of the parabolic mirror is illustrated in FIG. 1. The parabolic mirror can be made smaller if necessary also in its lateral extension. Since the adjustment element 4 is situated in the focal point of the parabolic mirror 5, the RGB laser beam 2, which is deflected towards the mirrored surface of the parabolic mirror 5, is reflected by the parabolic mirror 5 such that it extends, after reflection, parallel to the axis of symmetry thereof. Irrespective of the angular adjustments α and β of the adjustment element 4, all of the RGB laser beams 2 reflected on the parabolic mirror 5 extend parallel to the axis of symmetry of the parabolic mirror 5. The axis of symmetry of the parabolic mirror 5 can be orientated freely within certain limits. The radius of the parabolic mirror depends upon the mode of construction of the device which is orientated to the face size of the person, in whose eye the image is intended to be projected, and hence lies within a few centimetres.

After reflection on the parabolic mirror 5, the RGB laser beam 2 impinges on a second parabolic mirror 6. The axis of symmetry of the parabolic mirror 6 is orientated such that its axis of symmetry is parallel to the axis of symmetry of the parabolic mirror 5. The embodiment of the parabolic mirror is such that the RGB laser beam 2, deflected by the adjustment element 4 and reflected by the parabolic mirror 5, impinges on the parabolic mirror 6 for all reasonably occurring angles α and β of the adjustment element 4. For this reason, only the upper part of the parabolic mirror is illustrated in FIG. 1. The radius of the parabolic mirror 6 is chosen such that the 2D MEMS scanner 7 in an integrated construction can be impinged upon without great complexity. Taking into account the face size, the radius is then at a few centimetres. It is important that the radii of the parabolic mirrors 5 and 6 can also be chosen such that a small adjustment angle of the adjustment element 4 leads to large angles of incidence on the 2D MEMS scanner 7.

The second MEMS deflection mirror, which belongs to the 2D MEMs scanner 7 of the laser projection device, is situated in the focal point of the parabolic mirror 6. The 2D MEMS scanner 7 operates in the normal manner for generating a laser projection image. The 2D MEMS scanner 7 oscillates about its two torsion axes θ, φ), so that the laser beam covers a defined spatial angle element. Within this spatial angle element, the intensities of the three lasers are controlled with the known methods for an RGB system such that a pixel-precise image is generated. The scan angles θ, φ can be adjusted such that the projected laser image covers the retina of the eye in essential parts.

The embodiment of the 2D MEMS scanner is not subject to any special restrictions for use in the device. Advantageous embodiments are those 2D MEMS scanners which allow a high pixel density and a high image repetition rate. The mode of actuation of the 2D MEMS scanner is of no relevance for the device provided no geometric restrictions or constructional size cause a problem. This means that the mode of actuation can be electrostatic, magnetic, piezoelectric, mechanical or another, provided the pixel density or the image repetition rate is achieved and the achievable angle amplitudes enable extensive illumination of the retina. For applications in which only a small part of the retina is intended to be illuminated, even smaller angle amplitudes then suffice. For applications in which no complete image, but rather e.g. merely pictograms are intended to be projected into the eye, also a micromirror operating as a vector scanner can be used. The mirror surface preferably has a diameter of 1-2 mm. It should be sufficiently large to be able to neglect extensively diffraction phenomena of the laser light.

The use of a 2D MEMS scanner, rather than the use of two 1D MEMS scanners, has the advantage that the axes of rotation for the various pivot planes intersect so that the rotational point for both axes can be disposed precisely in the focus of a parabolic mirror.

Preferably, a Lissajous scanner is used as 2D scanner. A crucial precondition for operating this class of 2D scanners is that the angle positions of the mirror θ and φ are measured with great accuracy and in real time. Only the assignment of an angular position θ and φ to one pixel of the image to be projected and the therewith connected control of the RGB laser (colour components and intensity) enable reproduction of an image. The measuring method for determining the angular position θ and φ does not represent a restriction provided it is precise enough. A measuring method with sufficiently good accuracy is described in U. Hofmann, J. Janes, H.-J. Quenzer, High-Q MEMS Resonators for Laser Beam Scanning Displays, Micromachines, 3, 509-528 2012. Lissajous scanners, if they are operated under vacuum conditions, can be produced more robustly and compactly and require significantly smaller actuation powers compared with other MEMS scanners. In addition, Lissajous scanners have the advantage of constructing images generated by laser projection more rapidly and with a greater repetition rate than other MEMS scanners.

In FIG. 1, it is illustrated that the RGB laser beam 2 is deflected in a horizontal direction relative to the eye of an upright person. The beam with a deflection of the 2D MEMS scanner of 0° is illustrated, which corresponds to the central pixel in the horizontal direction, and the two maximum deflections corresponding to the amplitude of the 2D scanner, which corresponds to the angles of +/−40° in FIG. 1. In the one direction, the RGB laser beam, during the scanning, covers the angle range between the two maximum deflection angles, here between +/−40°. The device is however not restricted to an angle range of +/−40°.

Figure 7:
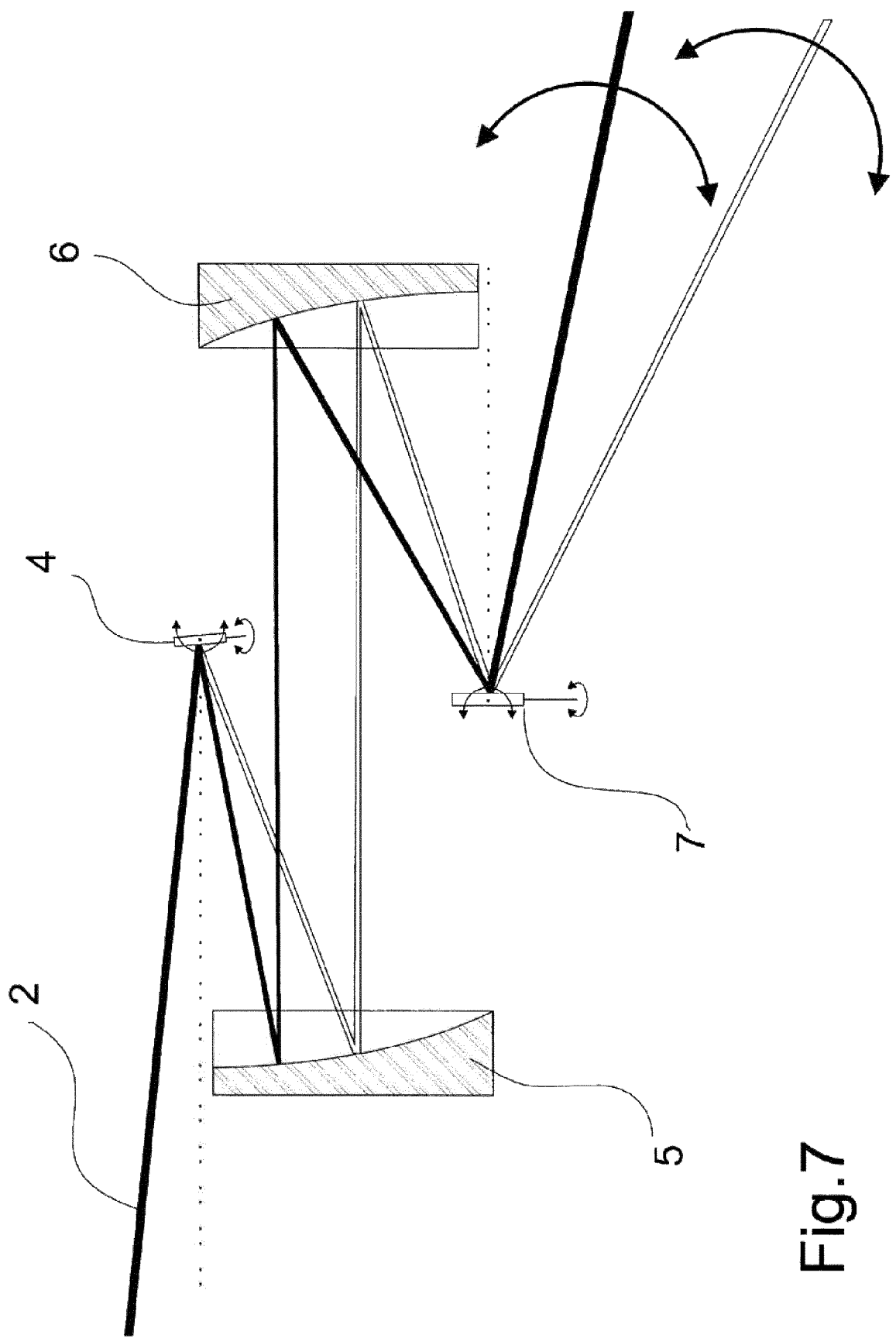

In the case of each scan angle, the RGB laser beam impinges on the reflection element 8 in the form of a mirror with specific surface curvature or also for example on a holographic reflector. The use of the mirror allows projection of the laser beam on the retina of the eye at any angular position of the 2D scanner 7. In order to achieve this without distortion, the surface of the mirror must be defined at every point with respect to its radius of curvature and its surface angle. It thereby results that the mirror surface is not rotationally-symmetrical and, in the vertical and horizontal direction, has different radii of curvature and surface directions. With respect to the optical axis of the eye, the surface is decentred, and it is advantageous to install the surface at a horizontal angle of a few degrees deviation from the eye axis or straight ahead viewing direction (see FIG. 8 in this respect). To sufficient approximation, it is possible to reach these targets also with an aspherical surface which is installed decentred and likewise has a horizontal diagonal position. This situation is illustrated in FIG. 7 and discussed below. The size of the mirror 8 is orientated towards the size of a typical spectacle lens which is retained as closely as possible to the eye and is adapted to the physiognomy of the face. In addition, the geometric configuration of the mirror must enable irradiation of the scanned image. The central axis of the mirror 8 is displaced relative to the position of the eye in the horizontal direction.

After the reflection of the laser beam 2 on the reflection element/mirror 8, the beam impinges on the eye 9. For calculating the beam paths of the device presented here, the optical parameters of the so-called Gullstrand eye were used. The Gullstrand eye 9 represents the distances, radii of curvature and refractive indices of all necessary optical elements of the eye. These parameters are illustrated in detail in FIG. 3.

Figure 2:
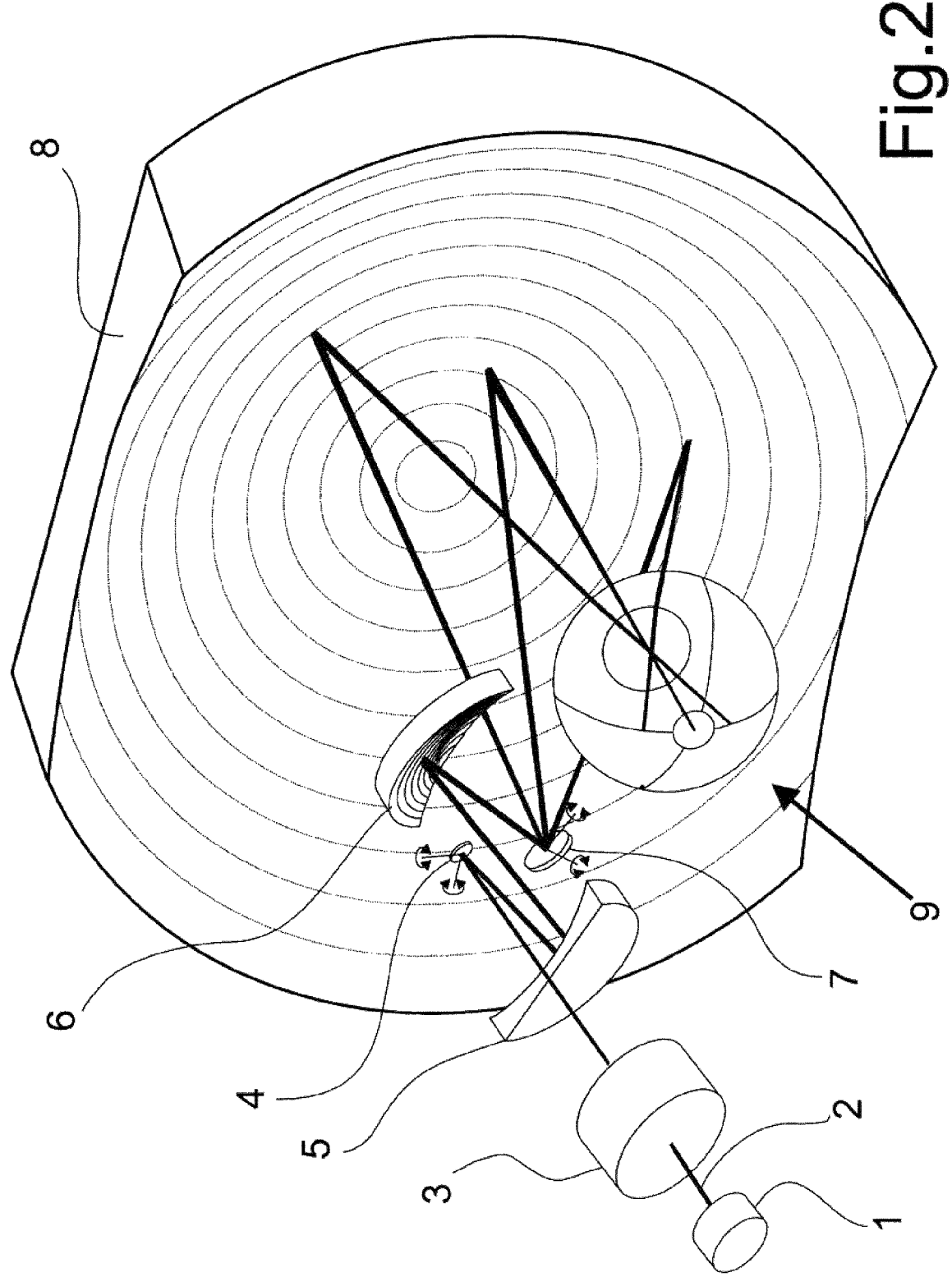

FIG. 2 shows the optical beam path through the device for the vertical image projection. FIG. 2 clarifies that the vertically deflected laser beam 2, after reflection on the reflection element 8, arrives completely on the retina of the eye 9.

Figure 3:
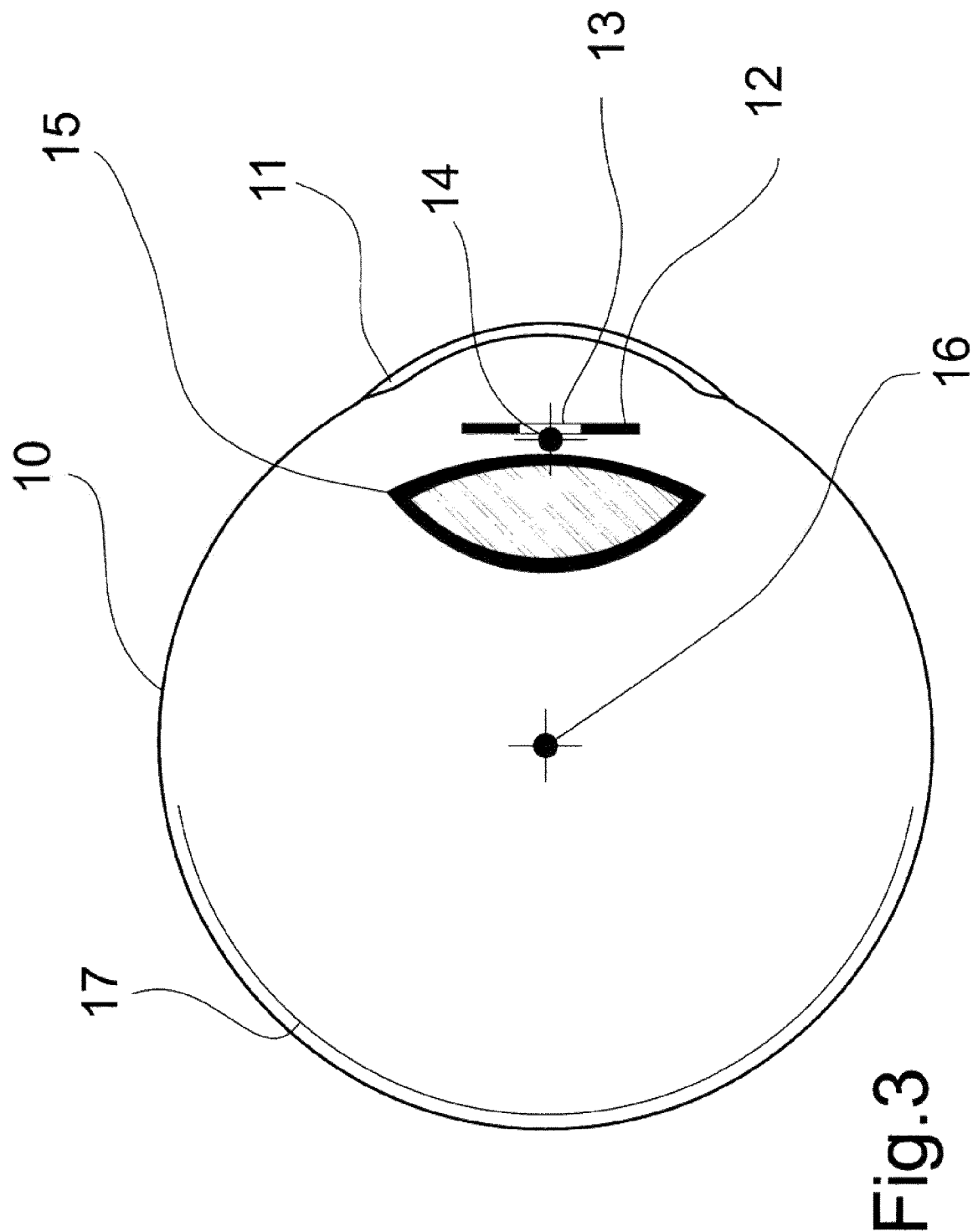

In FIG. 3, a human eye is illustrated schematically. This hereby concerns the standardised so-called Gullstrand eye. For calculating the beam paths (FIG. 1 *ff.*), the known distances, radii of curvature and refractive indices of the respective materials were used as base.

The eye ball 10 defines the region of the aqueous humour. The optical entrance of the eye is the cornea 11. The iris 12 with the pupil 13 represents the aperture in the optical sense. The focal point 14 represents the point through which the laser beam must go, irrespective of the angle, at which it impinges on the eye. The lens body 15 consists of the optical lens and the lens capsules. The accommodation of the eye was not taken into account during calculation of the beam paths. The turning point 16 of the eye represents the fictional point about which the eye moves. The exact point about which an individual eye moves plays only a subordinate role. Substantially more crucial for the optical considerations presented here is that the distance between the turning point 16 and the focal point 14 is approx. 11-12 mm. The retina with the fovea is illustrated with the imaging surface 17. (In the definition of the invention, the retina is mentioned as projection surface. By this imaging surface which can comprise the entire retina and fovea, however also only partial regions, is meant.)

It is an essential object of the invention, irrespective of the viewing direction of the eye, always to project the correct pixels of the image onto the correct location on the imaging surface 17. It is important to establish that, during an image generation method in which the beam path of the laser beam 2 is not tracked geometrically as a function of the viewing direction of the eye (turning about the turning point 16), a partial region of the image is always cut off by the pupil 13.

Figure 4:
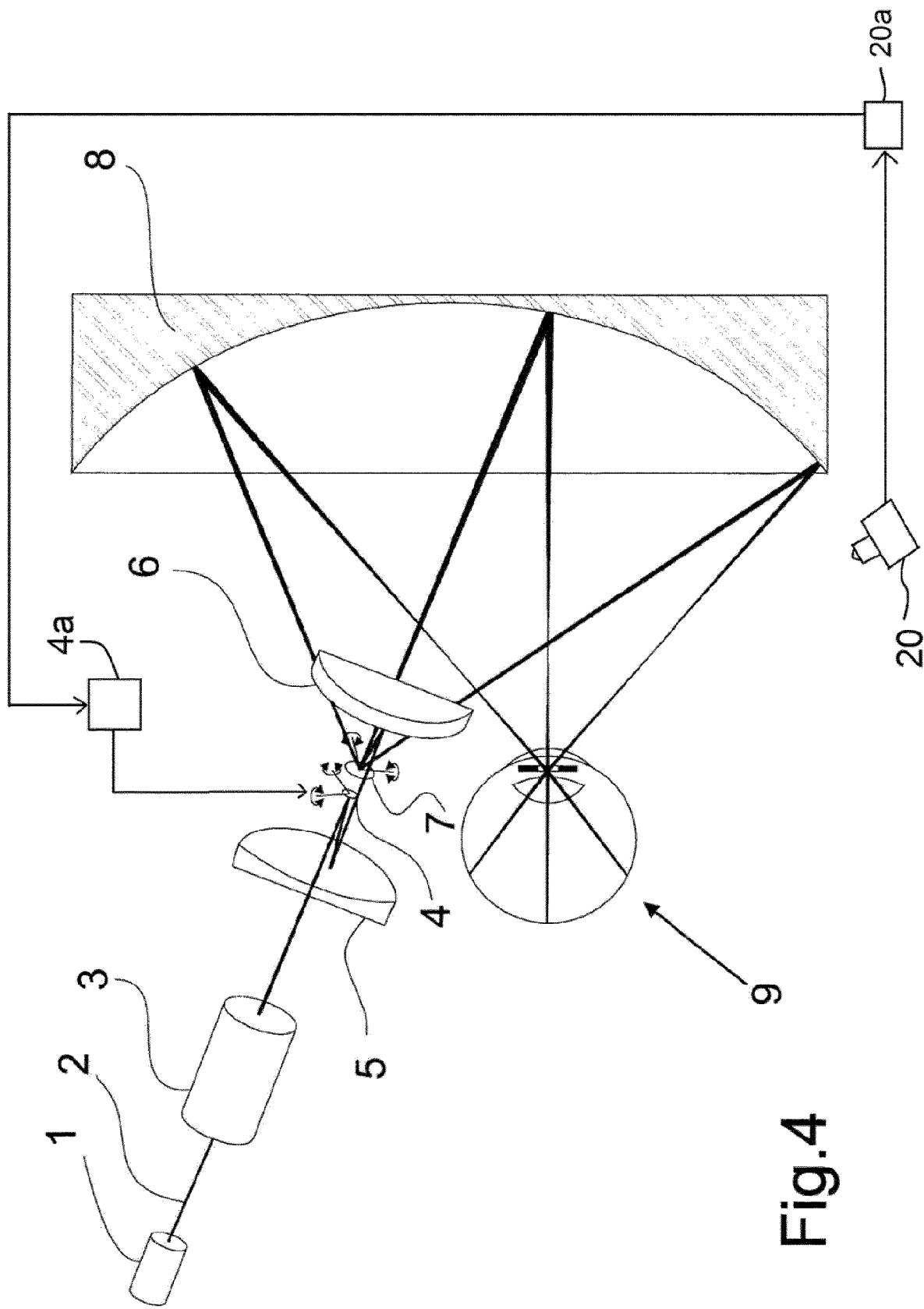
Figure 5:
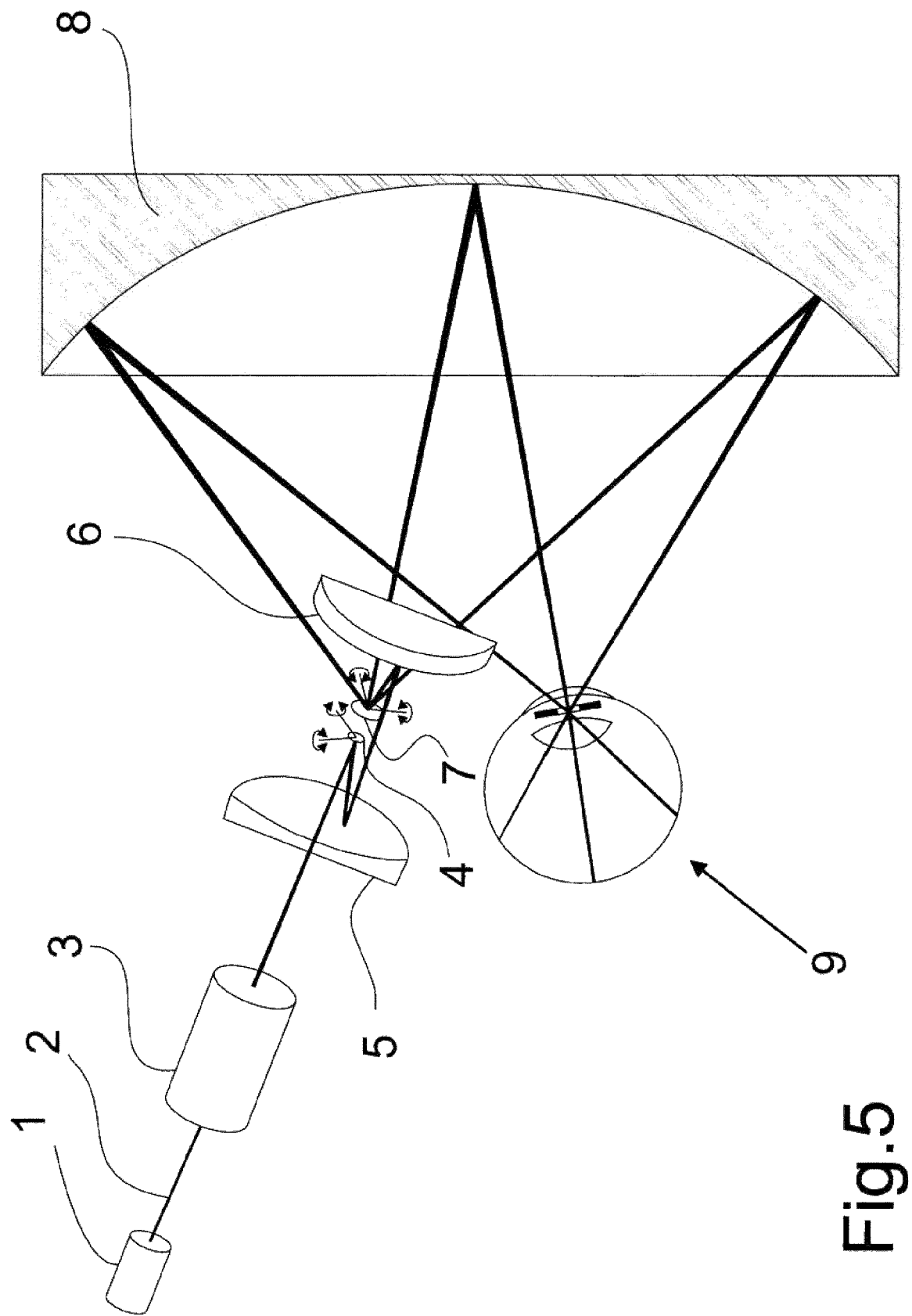

In FIG. 4, a sectional drawing which is produced through the horizontal optical plane is shown, associated with a plan view on the tracking unit, consisting of the adjustment element 4 and the two parabolic mirrors 5 and 6. FIG. 4 should be viewed in conjunction with FIG. 5, in which the viewing direction of the eye has rotated in the horizontal plane by 10°. The adjustment element 4 in FIG. 5 has a different adjustment angle from in FIG. 4. Therefore the laser beam 2 impinges on a corresponding location on the parabolic mirror 5. After reflection on the parabolic mirror 5, the laser beam 2 extends again parallel to the two axes of symmetry of the parabolic mirrors 5 and 6. In contrast to the situation in FIG. 4, the laser beam 2 impinges on a different location on the surface of the second parabolic mirror 6. Following thereon, the laser beam 2 is reflected at a different angle from the surface of the parabolic mirror 6 and therefore impinges on the 2D MEMS scanner 7 at a different angle. With the same scan amplitude of the 2D MEMS scanner 7, this has the result that the direction, in which the laser beam 2 leaves the 2D MEMS scanner at a scan angle of 0°, has been changed correspondingly. After reflection of the laser beam 2 on the reflection element 8, the latter then impinges on the eye 9 at the correct angle adapted to the viewing direction.

In FIG. 4, in addition for understanding, the eye tracking device in the form of a camera 20 and the analysis device 20*a* which determines the orientation angle of the eye is illustrated. The analysis device 20*a* is connected to the control device 4*a* which actuates the adjustment element 4.

Figure 6:
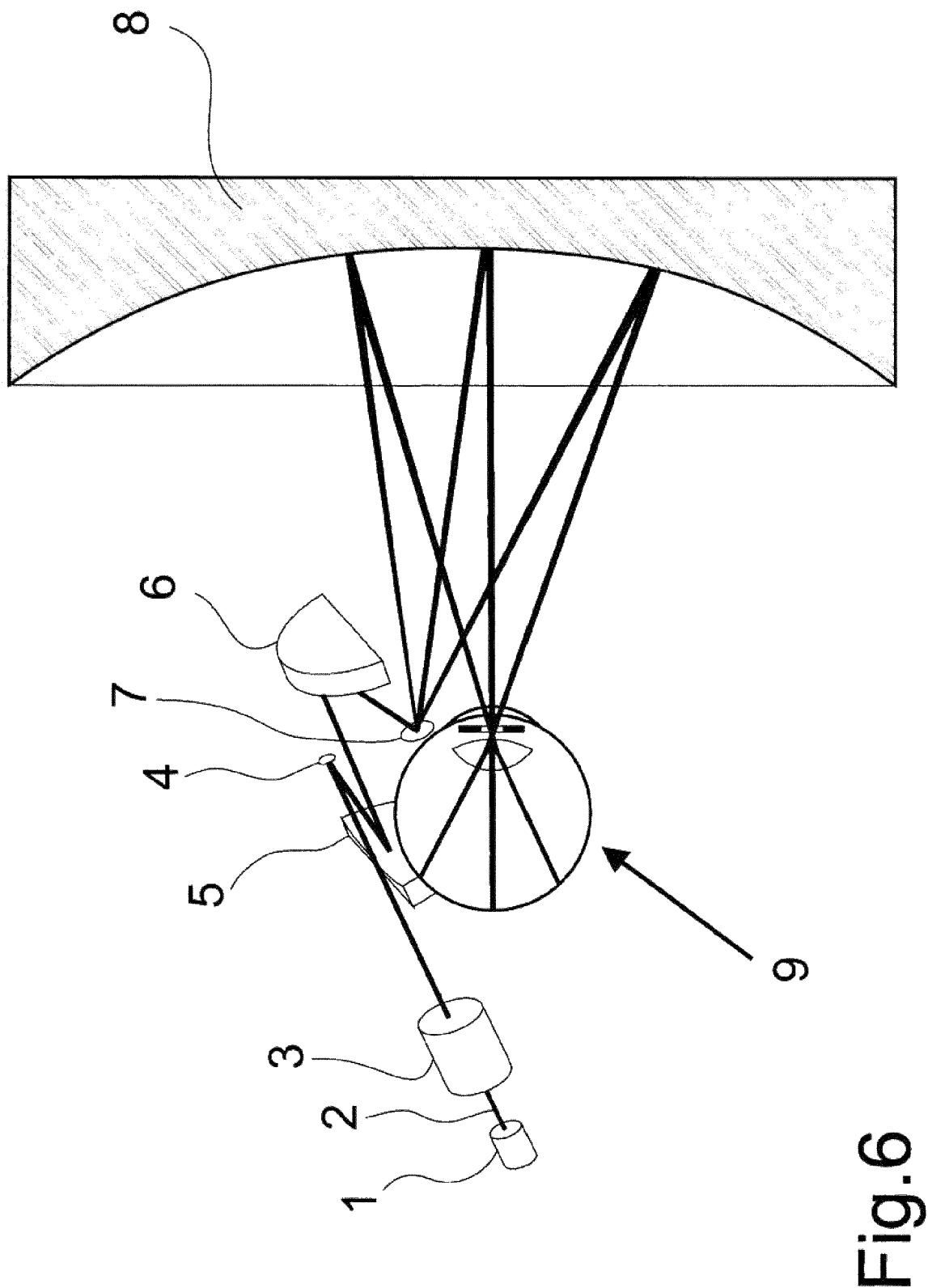

In FIG. 6, the situation for deflection of the laser beam 2 in the vertical direction is shown. This hereby concerns a sectional drawing through the plane of the eye 9, associated with a plan view on the tracking unit. In contrast to the horizontal situation (FIG. 4 and FIG. 5), the positioning of the reflection element 8 here is symmetrical to the optical axis of the eye 9 with a straight ahead viewing direction (0°).

In FIG. 7, the operation of the tracking unit with the adjustment element is illustrated enlarged. The laser beam 2 impinges on the adjustment element 4. The adjustment element 4 is situated in the focal point of the parabolic mirror 5. The adjustment element 4 is adjustable in two planes at the angles $\alpha$ and $\beta$. In FIG. 7, the beam path for two different adjustment angles is shown. The irradiation direction of the laser beam 2 must enable only reflection of the beam in the direction of the parabolic mirror 5, otherwise it is not restricted.

The preadjustment of the angles of the adjustment element 4 defines the point on the surface of the parabolic mirror 5 on which the laser beam is reflected. Basically there are no restrictions for this point. Practical considerations show however that it is advantageous to keep the adjustment range of the angles of the adjustment element as small as possible. From these practical considerations and from the fact that the projection device is intended to be installed in the vicinity of the eye, geometric boundary conditions result. The distance of the focal point of the first parabolic mirror 5 to the apex thereof is, in the example shown in FIG. 7, of the order of magnitude of 15 mm, the radius of the first parabolic mirror 5 is of the order of magnitude 30 mm. Provided the constructional geometry allows it and the production methods make it possible, these distances and radii can be correspondingly reduced in size.

The adjustment angles of the adjustment element are based on the angles of the viewing direction of the eye and on the enlargement factor which depends upon the radius of the second parabolic mirror 6. Preferably, an adjustment element with adjustment angles of a few degrees in both directions is used. In FIG. 7, two adjustment angles of the adjustment element 4 are shown. As a result thereof, two impingement points of the laser beam on the surface of the first parabolic mirror 5 result. Starting from these reflection points, the respective, reflected laser beams extend parallel to the axis of symmetry of the first parabolic mirror 5.

The second parabolic mirror 6 is installed such that its axis of symmetry is parallel to the axis of symmetry of the first parabolic mirror 5 and such that the reflecting surfaces of the two mirrors stand opposite each other. Hence, the laser beam 2, reflected by the parabolic mirror 5, extends also parallel to the axis of symmetry of the parabolic mirror 6. If this laser beam is reflected on the second parabolic mirror 6, it always extends through the focal point of the parabolic mirror 6. The distance of the focal point of the parabolic mirror 6 to the apex thereof, in FIG. 7, is of the order of magnitude of 15 mm, and the radius of the second parabolic mirror 6 is of the order of magnitude of 30 mm. The choice of radius makes it possible that the angle range in which the laser beam extends through the focal point, can be enlarged or reduced in size. For the functional capacity of the device described here, an enlargement is advantageous.

The 2D MEMS scanner 7 is fitted in the focal point of the parabolic mirror 6. The angle of incidence of the laser beam 2 on the mirror of the 2D MEMS scanner is defined by the angular position of the adjustment element 4 and the consequently fixed beam path via the two parabolic mirrors 5 and 6.

Whilst the scanned image size is defined by the angle amplitudes of the 2D MEMS scanner 7, the spatial angle element in which the scanned image is projected, starting from the 2D MEMS scanner as zero point, is determined by the adjustment element 4 or by the angle of incidence of the laser beam on the 2D MEMS scanner. With this part of the device, it is possible to follow the momentary viewing direction of the eye contemporaneously.

Figure 8:
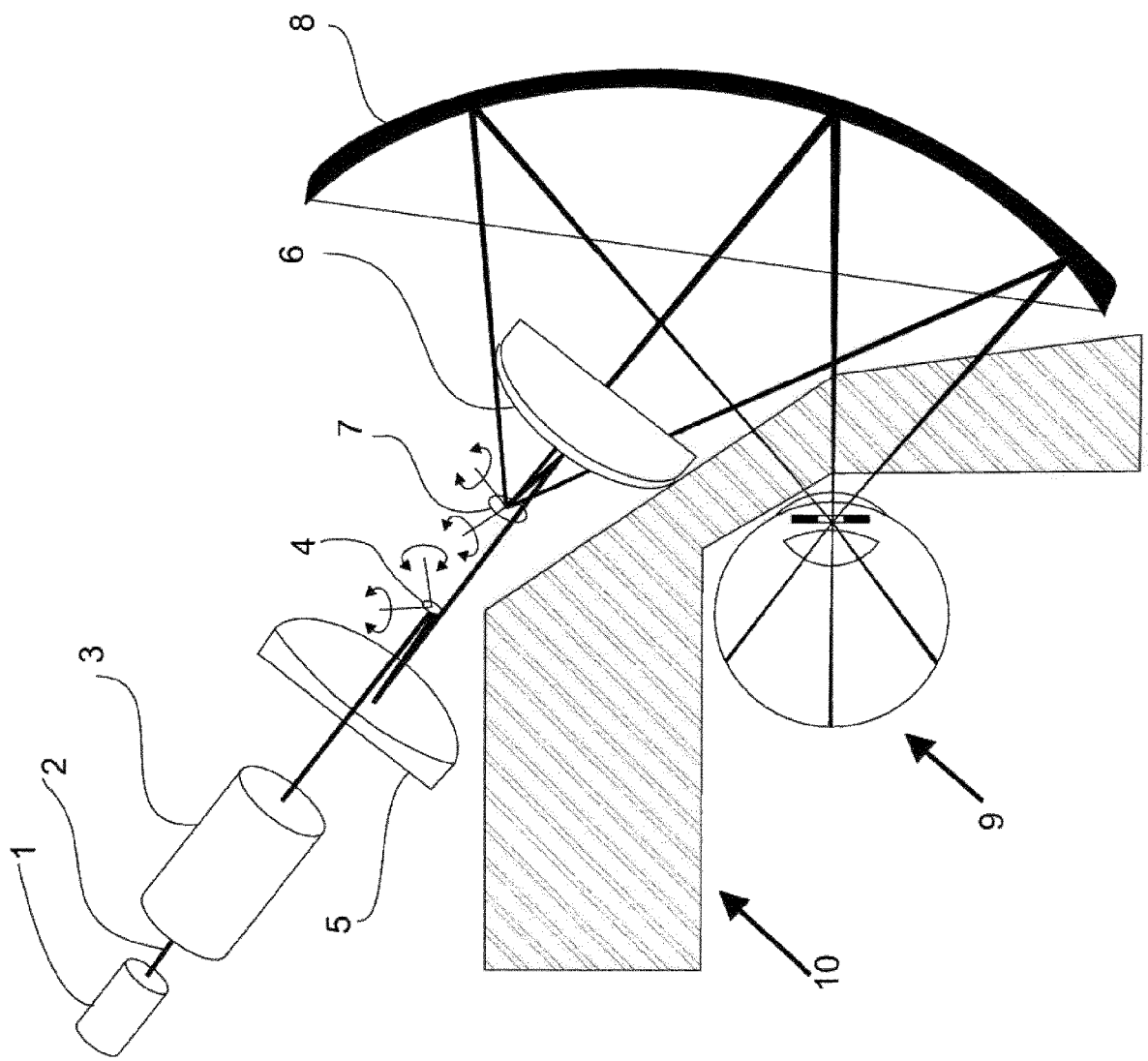

In FIG. 8, a continuing form of the device is shown. In addition to FIG. 1 *ff*., an area 10 is illustrated in FIG. 8. This space in the horizontal plane at the level of the eye must remain free of constructional elements for reasons of the physiognomy. Within this space there are inter alia the temples, the eyelashes and the bridge of the nose of the person in whose eye the image is intended to be produced. The upper limit of the area 10 in FIG. 8 is approx. the line on which the frame of spectacles is situated. The lower limit indicates where the ideal plane of symmetry is situated.

In order to ensure that the optical elements 1 to 7 are not at variance with the physiognomy, there is both the possibility of designing the optical elements to be smaller and the advantageous possibility of rotating the reflection element 8 horizontally (about a vertical axis). In FIG. 8, this situation is illustrated for an angle of rotation of 8°. In contrast to FIG. 4 to FIG. 6, the reflection element 8 is configured here as a thin variant made of transparent optical material, e.g. glass. The reflecting surface is partially mirrored so that always only a part of the laser beam 2 reaches the eye 9. The advantage of this embodiment is that the real image of the surroundings, likewise due to the reflection element, reaches the eye in this way. The superimposition of the real image with the scanned, projected laser image makes possible the configuration of the device for "augmented reality" applications. In this embodiment, it is possible in addition to configure the partially mirrored material as spectacles in order to correct visual errors. Of course the geometric parameters of the reflecting surface must thereby be maintained.

FIG. 9 represents the construction of the device as double projection device in both eyes. An essential point of this illustration is that it is detectable that the reflection elements 8 and 8a can be configured such that they have no overlapping region. The two reflection elements 8 and 8a have opposite angles of rotation in the horizontal direction. In order to ensure that, at any point in time, the respective pixels are projected on the intended position of the retina, it is necessary to coordinate to each other the angle amplitudes in both directions (they must be of equal size) and to control them so that they are constant.

Because of the fact that the laser beam impinges on the mirror of the 2D MEMS scanner at an oblique angle, it is necessary to compensate for the distortion of the projected image. The distortion is a function of the momentary irradiation direction of the laser beam on the 2D MEMS scanner, i.e. upon the angular position of the adjustment element 4 and hence ultimately upon the momentary viewing direction of the eye. A possible electronic or software distortion routine must therefore be coupled to the angular position of the adjustment element. In addition, it must be established that, in the horizontal scan direction of the 2D MEMS scanner, the angular deflection is asymmetrical relative to the 0° deflection. This derives therefore from the fact that the reflection element 8 is firstly displaced horizontally (decentred) and secondly has an angle of rotation about a vertical axis (in the calculations used here, this is 8°). It follows therefrom that the position of each pixel must be corrected in the horizontal direction as a function of the deflection angle of the 2D MEMS scanner.

With the help of the laser projection on the retina in both eyes and the required electronic image processing, scenarios are produced which give a perspective visual impression. Above all for visual impressions which reveal an image in the foreground, the optical axes of both eyes are at a comparatively large angle, compared with a visual impression which conveys a great distance. With the optical device presented here, this "image in the foreground" can be achieved for a large range of the total viewing direction.

In the context of laser projection directly in the eye and the "tracking" of the projection image as a function of the viewing direction of the eye, a further advantageous application of the device is produced. Firstly it is important to establish that the physiological construction of the eye only then allows sharp perception of a real image if this is imaged on the fovea as part of the retina. Outside the region of the fovea, no "sharp" image is perceived.

This fact opens up the possibility that the laser projection image, as is produced on the retina in the manner proposed here, is projected outside the fovea with a smaller pixel density than in the region of the fovea. This situation is illustrated schematically in FIG. 10. The retina with a low resolution is represented by the area 11. The surface 12 represents the area in which an image is generated on the retina with scanning laser projection. The smaller area 13 represents the fovea, and the edged surface 14 indicates the area in which the pixel density of the laser projection is higher. The geometric forms of the areas 12 to 14 here are arbitrary. Since the complete image generated by laser projection is tracked synchronously with the viewing direction of the eye, the same pixels (with alternating images then with alternating pixel content) are always projected on the same coordinates of the retina. Only a corresponding software control is required in order to enable different pixel densities in the areas 12 and 14. For example, the pixel density in the area 14 should be at n per $mm^2$ (n=natural number) in order to generate a high-resolution scanned image on the fovea 13. For the area outside the fovea 12, a lower resolution (for example less by the factor 5 or 10) is required, which is fulfilled e.g. with a pixel density of 0.1 n per $mm^2$. However this means advantageously that in total per image, fewer pixels and memory space required therefor need be maintained. Furthermore, it emerges therefrom that, with a fixed image repetition rate, the data transmission rate can be reduced.

The invention claimed is:

1. A device for projecting a laser beam for generating an image on the retina of an eye, the device comprising:
   a laser projection device to project a laser beam;
   a device configured to determine an orientation of the eye; and
   a tracking device for tracking the laser beam projected by the laser projection device according to the determined orientation.

2. The device according to claim 1, wherein the tracking device includes an adjustment element, wherein the adjustment element is a controllable deflection mirror, and wherein an adjustment angle of the controllable deflection mirror is controlled by a control device as a function of the determined orientation of the eye.

3. The device according to claim 2, wherein the adjustment element is located in a path of the laser beam in front of the laser projection device.

4. The device according to claim 2, wherein the adjustment element is configured as a first MEMS deflection mirror.

5. The device according to claim 2, wherein the laser projection device includes a scanning deflection device, wherein the scanning deflection device is a second MEMS deflection mirror.

6. The device according to claim 5, wherein the laser projection device has a first parabolic mirror and a second parabolic mirror, wherein the first parabolic mirror includes an optical axis and the second parabolic mirror includes an optical axis, and wherein the optical axis of the first parabolic mirror and the optical axis of the second parabolic mirror are orientated parallel to each other.

7. The device according to claim 6, wherein the adjustment element is disposed in a focal point of the first parabolic mirror of the laser projection device.

8. The device according to claim 6, wherein the scanning deflection device is disposed in a focal point of the second parabolic mirror of the laser projection device.

9. The device according to claim 1, further comprising:
   a reflection element located in a path of the laser beam behind the laser projection device, wherein the reflection element is a hollow mirror.

10. The device according to claim 9, wherein the reflection element is optically transparent and partially mirrored.

11. The device according to claim 9, wherein the reflection element is asymmetrical.

12. The device according to claim 9, further comprising:
    an actuation device provided and fitted such that, during actuation of at least one of a first MEMS deflection mirror or a second MEMS deflection mirror, a corrected deflection angle is determined from a respectively determined deflection angle to compensate for a distortion by the reflection element, wherein the first MEMS deflection mirror is an adjustment element located in a path of the laser beam in front of the laser projection device, and wherein the second MEMS deflection mirror is a scanning deflection device included as a part of the laser projection device.

13. The device according to claim 1, wherein the laser beam is composed of at least two partial beams, wherein the at least two partial beams are at least one of: a different color or a different wavelength in temporal succession.

14. A spectacle device comprising:
    at least two laser projection devices to project a laser beam;
    at least two devices configured to determine an orientation of an eye; and
    at least two tracking devices for tracking the laser beams of the at least two laser projection devices according to the determined orientation.

15. The spectacle device according to claim 14, wherein each of the laser projection devices include a first parabolic mirror and a second parabolic mirror, wherein the first parabolic mirror and the second parabolic mirror include an asymmetrical cut-out for space-saving, and wherein a spatial angle of at least one of the first parabolic mirror or the second parabolic mirror is covered by the laser beam being projected by at least one of the two laser projection devices.

\* \* \* \* \*